US005764479A

United States Patent [19]
Crump et al.

[11] Patent Number: 5,764,479
[45] Date of Patent: Jun. 9, 1998

[54] SPLIT SYSTEM PERSONAL COMPUTER HAVING FLOPPY DISK DRIVE MOVEABLE BETWEEN ACCESSIBLE AND INACCESSIBLE POSITIONS

[75] Inventors: Dwayne Thomas Crump, Apex, N.C.; John Peter Karidis, Ossining, N.Y.; Steve Pancoast, San Jose, Calif.; Russell Alan Resnick; Robert Christian Schwartz, both of Raleigh, N.C.

[73] Assignee: International Business Machines Corporation, Armonk, N.Y.

[21] Appl. No.: 721,651

[22] Filed: Sep. 23, 1996

[51] Int. Cl.$^6$ .............................. G06F 1/16; G11B 33/12; H05K 7/16
[52] U.S. Cl. .............................. 361/685; 361/686
[58] Field of Search ............... 364/708.1; 361/680–686, 361/724–727; 312/319.1, 319.2, 223.2, 327, 21, 26, 204

[56] References Cited

U.S. PATENT DOCUMENTS

| | | |
|---|---|---|
| D. 361,550 | 8/1995 | Mundt et al. . |
| 4,577,187 | 3/1986 | Barr et al. . |
| 4,665,501 | 5/1987 | Saldin et sl. . |
| 4,669,053 | 5/1987 | Krenz ................ 361/685 X |
| 4,954,966 | 9/1990 | Mooney et al. . |
| 5,021,922 | 6/1991 | Davis et al. ........... 361/685 X |
| 5,027,257 | 6/1991 | Lockwood et al. . |
| 5,099,137 | 3/1992 | Lattin, Jr. . |
| 5,132,871 | 7/1992 | Densham et al. .......... 361/685 |
| 5,190,258 | 3/1993 | Yu . |
| 5,247,428 | 9/1993 | Yu ...................... 361/680 |
| 5,572,402 | 11/1996 | Jeong .................. 361/685 |
| 5,621,612 | 4/1997 | Dahmen ................ 361/683 |

FOREIGN PATENT DOCUMENTS

WO94/29783  12/1994  WIPO .

*Primary Examiner*—Michael W. Phillips
*Attorney, Agent, or Firm*—Anthony N. Magistrale

[57] ABSTRACT

Disclosed is a personal computer system that includes a media console coupled to a system unit with a multi-conductor cable. The media console contains a direct access storage device (e.g., floppy disk drive) having an opening for receiving a removable storage medium. The system unit is separate from the media console and includes a microprocessor coupled to a first bus, a non-volatile storage device coupled to the first bus and a power supply for supplying power to the the system. The multi-conductor cable has one end coupled to the media console and another end coupled to the system unit for electrically connecting devices in the media console to devices in the system unit.

25 Claims, 14 Drawing Sheets

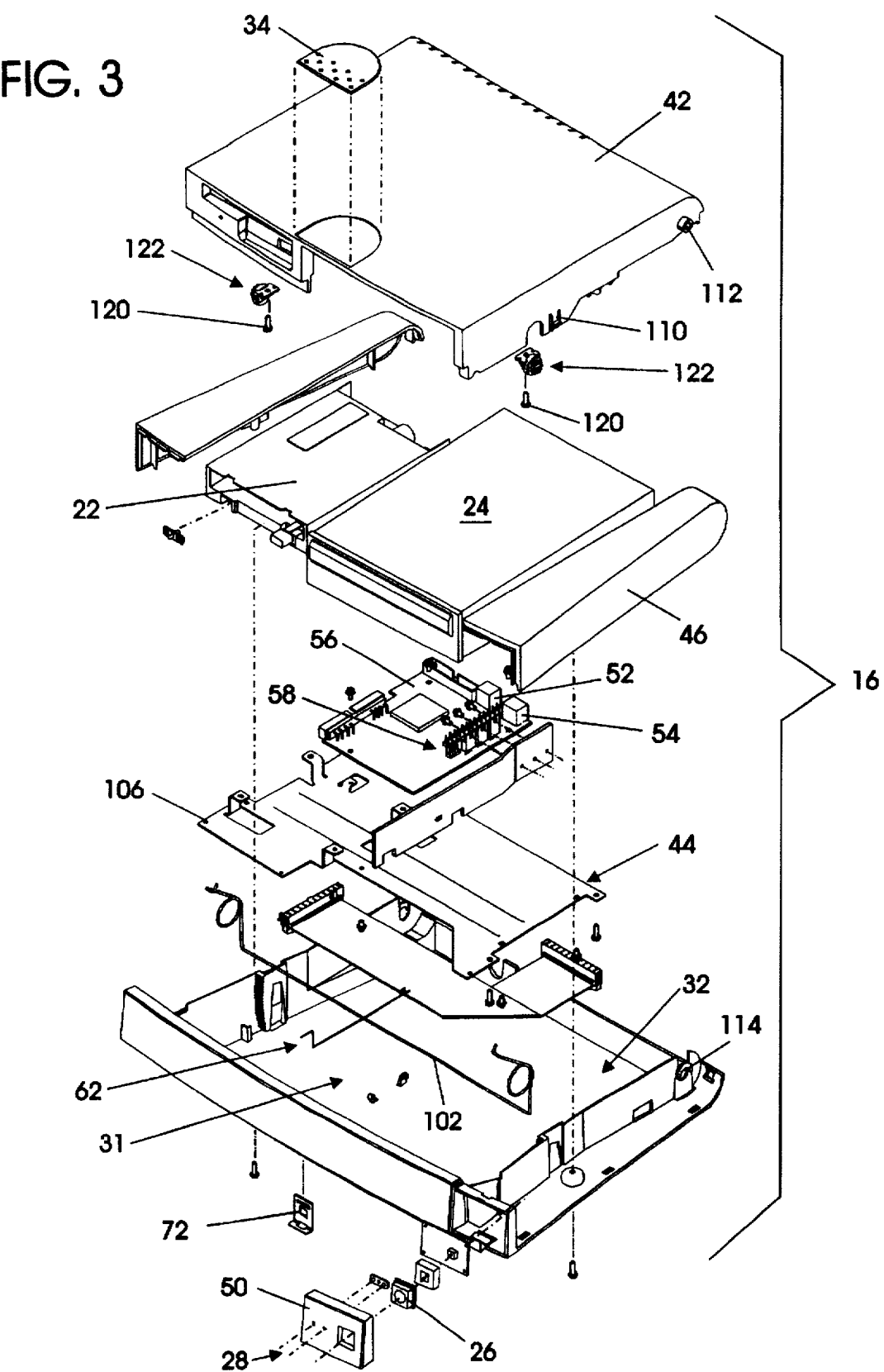

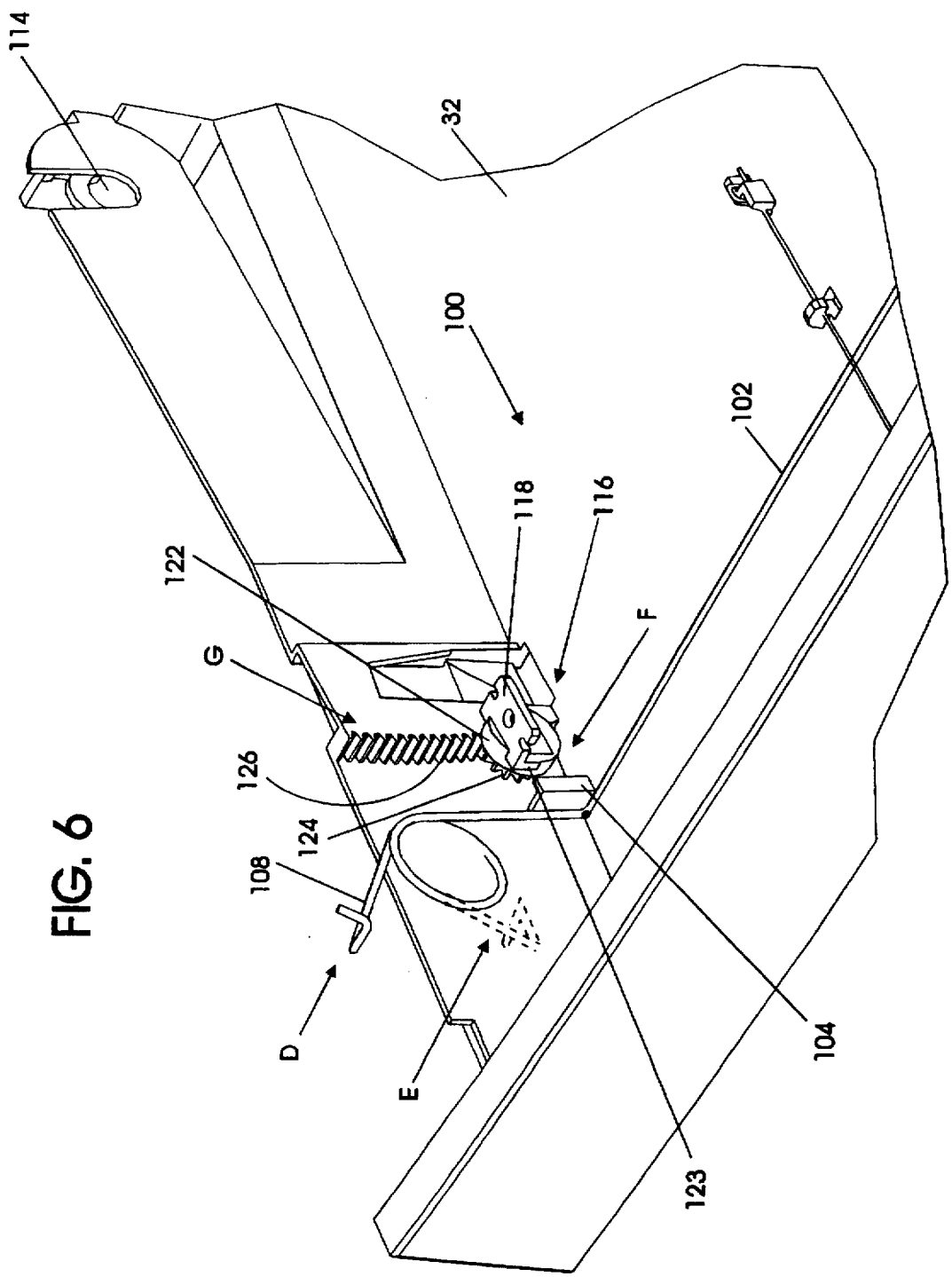

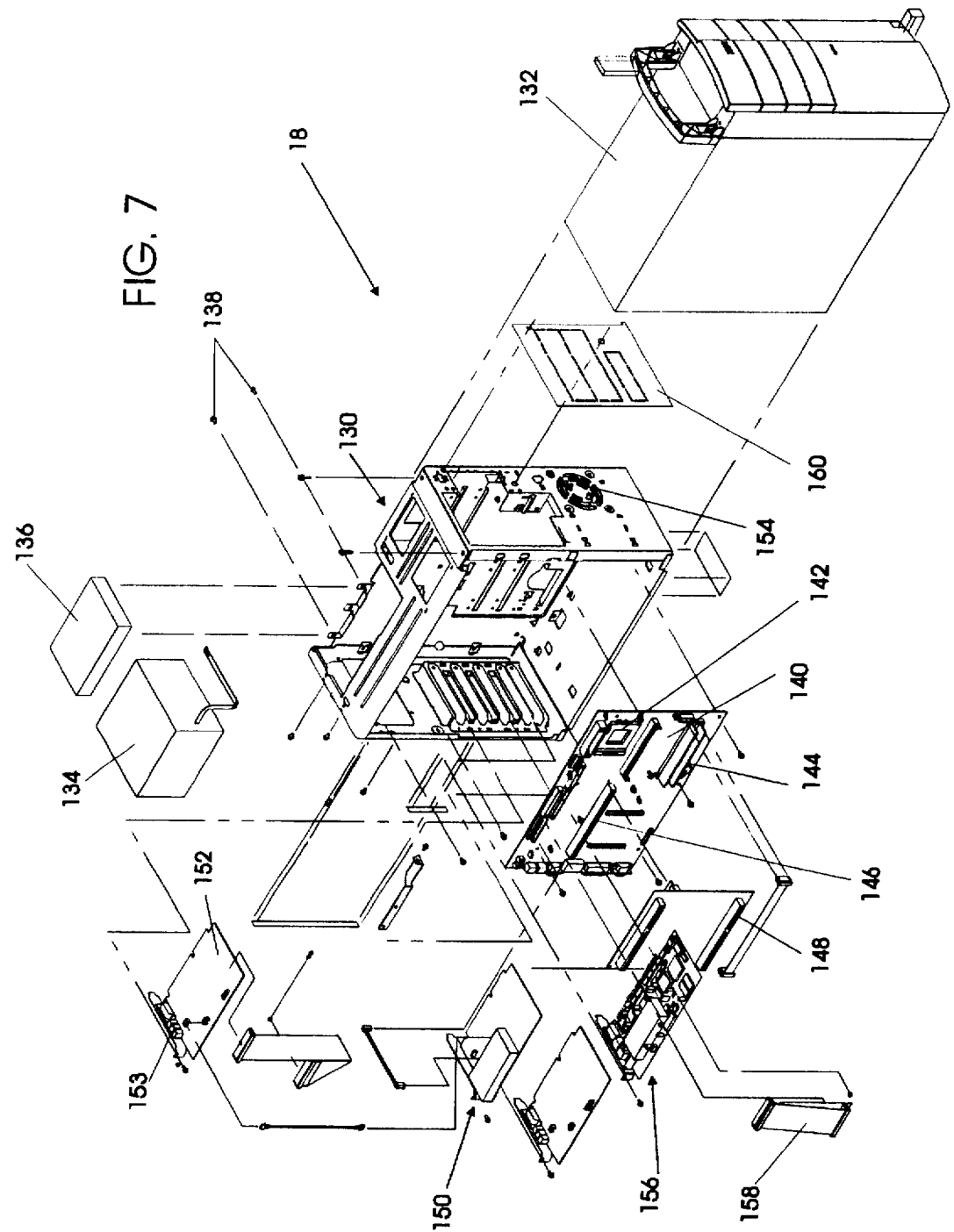

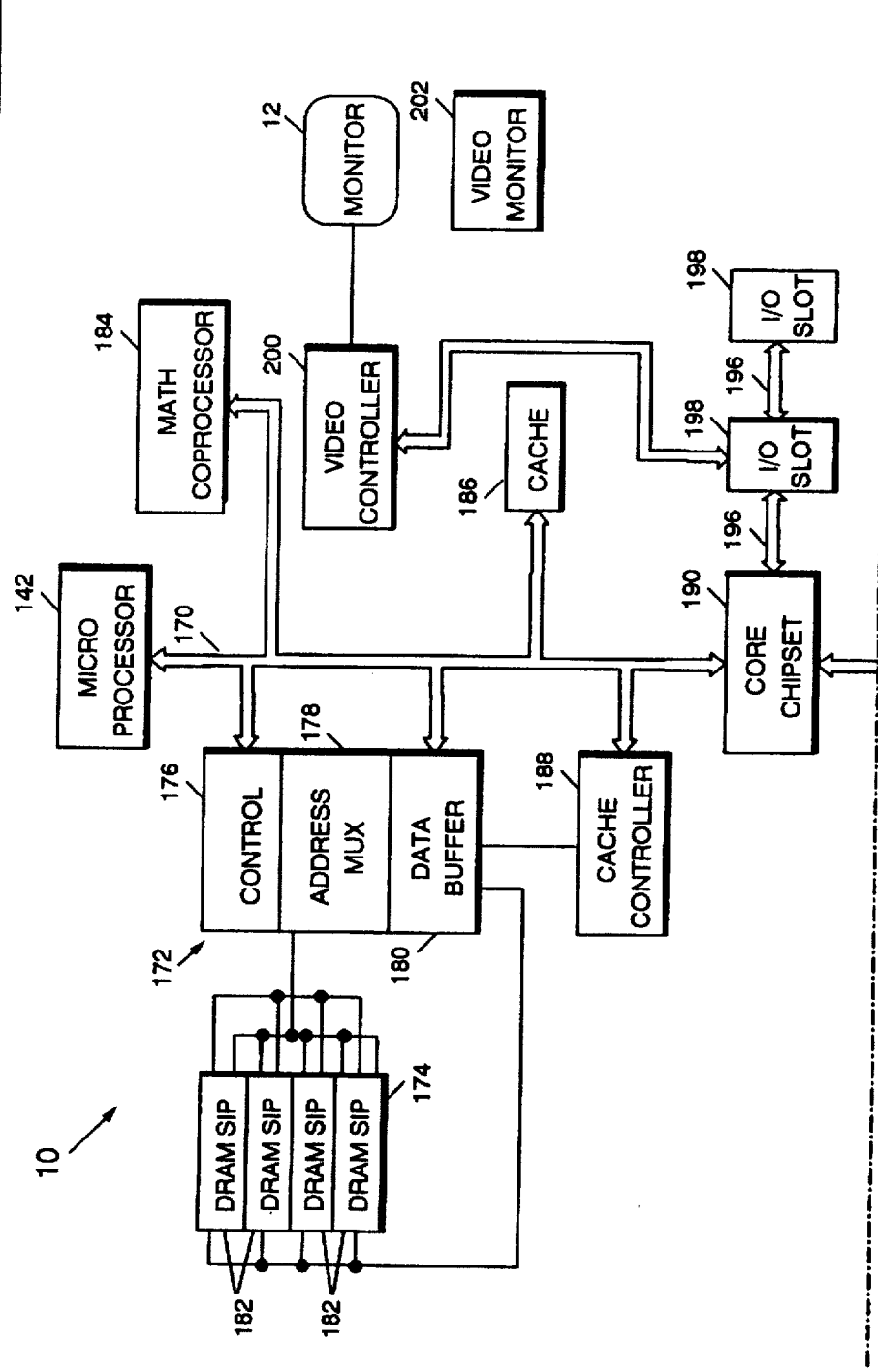

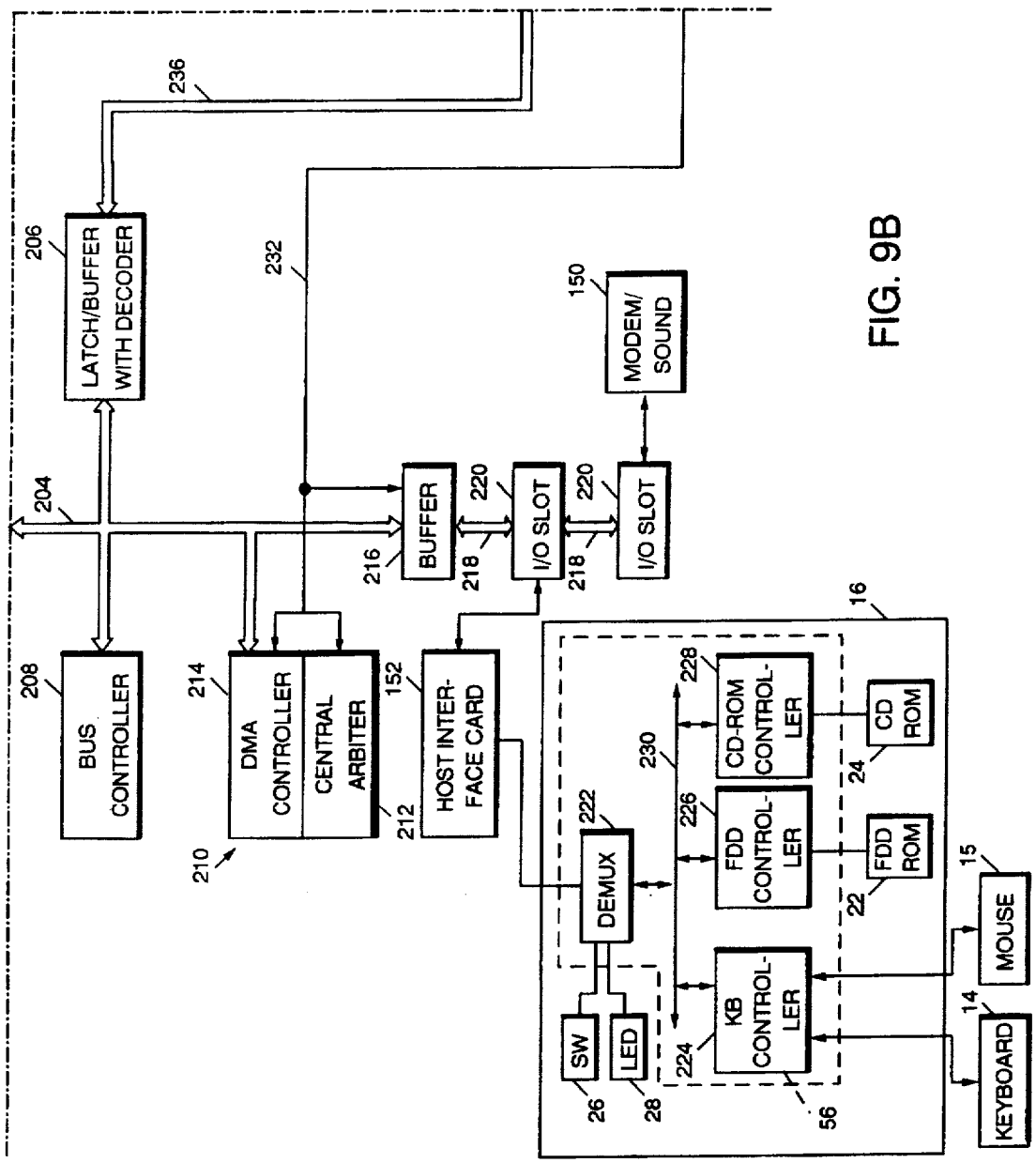

FIG. 12

| n | | | n | | |
|---|---|---|---|---|---|
| 1 | ON_OFF | THIS SIGNAL PARALLELS THE SWITCH BERG (751 PIN 9) | 2 | VOL_UP | DIGITAL VOLUME UP CONTROL FOR PLANAR AUDIO |
| 3 | P_LED | GREEN LED CONTROL (751 PIN 26) | 4 | VOL_DN | DIGITAL VOLUME DOWN CONTROL FOR PLANAR AUDIO |
| 5 | AUX5 | AUXILIARY POWER (FROM POWER SUPPLY CONNECTOR) | 6 | GND | |
| 7 | IRQ1 | KEYBOARD INTERRUPT ALL OTHER IRQs NECESSARY ARE AVAILABLE ON THE ISA BUS | 6 | GND | |
| 9 | IDE_LED | HDD INDICATOR DRIVE (FROM LED HEADER) | 10 | SMI_GEN | ALLOWS FOR SMI GENERATION ON FDD IO TRAP FOR MUXING FDD CONTROLLERS. THIS SIGNAL CAN BE WIRE ORED WITH THE EPMI PIN (751 PIN 3) |

FIG. 14

| PIN | SIGNAL | PIN | SIGNAL |
|---|---|---|---|
| 1 | DATA15 | 26 | CD_AUDIO_L |
| 2 | DATA14 | 27 | CD_AUDIO_LGND |
| 3 | DATA13 | 28 | CD_AUDIO_R |
| 4 | DATA12 | 29 | CD_AUDIO_RGND |
| 5 | DATA11 | 30 | +12V_DROP |
| 6 | DATA10 | 31 | +12V_DROP |
| 7 | DATA9 | 32 | +12V_DROP |
| 8 | DATA8 | 33 | *12VDC |
| 9 | ADR_EN | 34 | *12VDC |
| 10 | DAT_EN# | 35 | *12VDC |
| 11 | R/W# | 36 | GND |
| 12 | IRQ_STRB# | 37 | GND |
| 13 | TC_BUF | 38 | GND |
| 14 | DRQA# | 39 | GND |
| 15 | DRQB# | 40 | GND |
| 16 | DRQC# | 41 | GND |
| 17 | HDD/IORDY | 42 | GND |
| 18 | DATA7 | 43 | GND |
| 19 | DATA6 | 44 | GND |
| 20 | DATA5 | 45 | GND |
| 21 | DATA4 | 46 | GND |
| 22 | DATA3 | 47 | SPARE |
| 23 | DATA2 | 48 | PWR_LED_ANODE |
| 24 | DATA1 | 49 | AUX5 |
| 25 | DATA0 | 50 | ON_PULSE |

SPLIT SYSTEM PERSONAL COMPUTER HAVING FLOPPY DISK DRIVE MOVEABLE BETWEEN ACCESSIBLE AND INACCESSIBLE POSITIONS

RELATED APPLICATIONS

The present invention is believed to be related to the following pending applications:

Application Ser. No. 08/721,653, filed Sep. 23, 1996, and entitled "MEDIA CONSOLE FOR A SPLIT SYSTEM PERSONAL COMPUTER" (further identified as Attorney Docket No. RP9-95-046);

Application Ser. No. 08/721,650, filed Sep. 23, 1996, and entitled "MULTI-CONDUCTOR CABLE ARCHITECTURE AND INTERFACE FOR A SPLIT SYSTEM PERSONAL COMPUTER" (further identified as Attorney Docket No. RP9-96-009);

Application Ser. No. 08/717,558, filed Sep. 23, 1996, and entitled "METHOD FOR INTERFACING A MEDIA CONSOLE AND A SYSTEM UNIT" (further identified as Attorney Docket No. RP9-96-014);

Application Ser. No. 08/721,652, filed Sep. 23, 1996, and entitled "RAISE/SUPPORT ASSEMBLY FOR A MEDIA CONSOLE OF A SPLIT SYSTEM PERSONAL COMPUTER" (further identified as Attorney Docket No. RP9-96-012);

BACKGROUND OF THE INVENTION

1. Field of the Invention

The present invention relates to personal computer systems and more particularly to a split system personal computer which includes a media console containing user interactive components (e.g., floppy disk drive, power switch) coupled to a processing unit having system components (e.g., central processing unit, memory, hard disk drive) via a multi-conductor cable.

2. Description of Related Art

Personal computer systems are well known in the art. Personal computer systems in general, and IBM Personal Computers in particular, have attained widespread use for providing computer power to many segments of today's modern society. Personal computers can typically be defined as a desktop, floor standing, or portable microcomputer that is comprised of a system unit having a single central processing unit (CPU) and associated volatile and non-volatile memory, including all RAM and BIOS ROM, a system monitor, a keyboard, one or more flexible diskette drives, a fixed disk storage drive (also known as a "hard drive"), a so-called "mouse" pointing device, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's Personal Computer AT and IBM's Aptiva.

Historically, a personal computer (PC) was a relatively large box that sat on top of a desk and contained all of the electronics—the processor, memory, IO devices, floppy disk drive, etc. This was known as the system unit and required a significant amount of desktop work space. The monitor was traditionally a cathode ray tube (CRT) that was placed on top of the system unit. The keyboard and (eventually a mouse) was placed in front of the system unit to provide for user input. Accordingly, these "desktop" computer systems combined all PC functions and accessibility in one enclosure on the desktop where significant space is required and noise sources are relatively close to the user. In addition, there was no way to compact the elements when the PC was not in use.

In order to reduce the clutter that a personal computer caused on the desktop, a tower design soon emerged that moved the system unit components into a tower form-factor that sat along-side the desk. The CRT now sat directly on the desk with the keyboard and mouse in front of it. However, this "minitower" type unit is typically placed on the floor where accessibility to drives (floppy and CD-ROM), power, and system activity (LEDs) is compromised and awkward. These two form factors (the "desktop" and "minitower" systems) have endured for quite some time with just various changes in the size, shape and color.

In addition, the above conventional desktop and minitower computer systems either expose all of their media devices (e.g., floppy disk drive, CD-ROM drive) or cover the devices with a horizontally or vertically sliding door respectively. The door, however, is undesirable during use because it represents an additional step to open, or if left open, is often in the way, can easily be damaged and can require additional work space.

It is therefor desirable to provide a personal computer system form factor that significantly reduces the amount of desktop space needed, reduces noise on the desktop and provides easy accessibility to removable DASD drives.

SUMMARY OF THE INVENTION

The present invention is directed to a computer system that includes a media console coupled to a system unit with a multi-conductor cable. The media console contains a direct access storage device (e.g., floppy disk drive) having an opening for receiving a removable storage medium. The system unit is separate from the media console and includes a microprocessor coupled to a first bus, a non-volatile storage device coupled to the first bus and a power supply for supplying power to the system. The multi-conductor cable has one end coupled to the media console and another end coupled to the system unit for electrically connecting devices in the media console to devices in the system unit.

The computer system of the present invention removes all the components which a user does not need to interact with away from the desktop work space. As a result, the components which are disposed in the media console on the desktop have a much smaller profile than conventional desktop personal computers. Accordingly, the system of the present invention provides a computer system form factor that significantly reduces the amount of desktop space needed, reduces noise on the desktop and provides easy accessibility to removable direct access storage drives.

BRIEF DESCRIPTION OF THE DRAWINGS

FIG. 3 is an exploded perspective view of certain elements of the media console of FIG. 1 including a base member, drive housing, raise/support mechanism, a latch, electromechanical direct access storage devices and an electronic card, and illustrating certain relationships among those elements.

FIG. 6 is an enlarged perspective view of a portion of the front and left sides of the media console base member showing the raise/support mechanism in accordance with the present invention.

FIG. 7 is an exploded perspective view of certain elements of the processing unit of FIG. 1 including a planar board, CPU, power supply, hard disk drive, ISA interface electronic card and cover, and illustrating certain relationships among those elements.

FIGS. 9–9C are a block diagram of certain components of the computer system of FIGS. 1 and 2.

FIG. 12 is a table of each signal of the 10 pin planar connector on the ISA interface card along with its function description.

FIG. 14 is a table of the signal layout of the multi-conductor flexible cable used in accordance with the present invention.

DETAILED DESCRIPTION OF THE INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
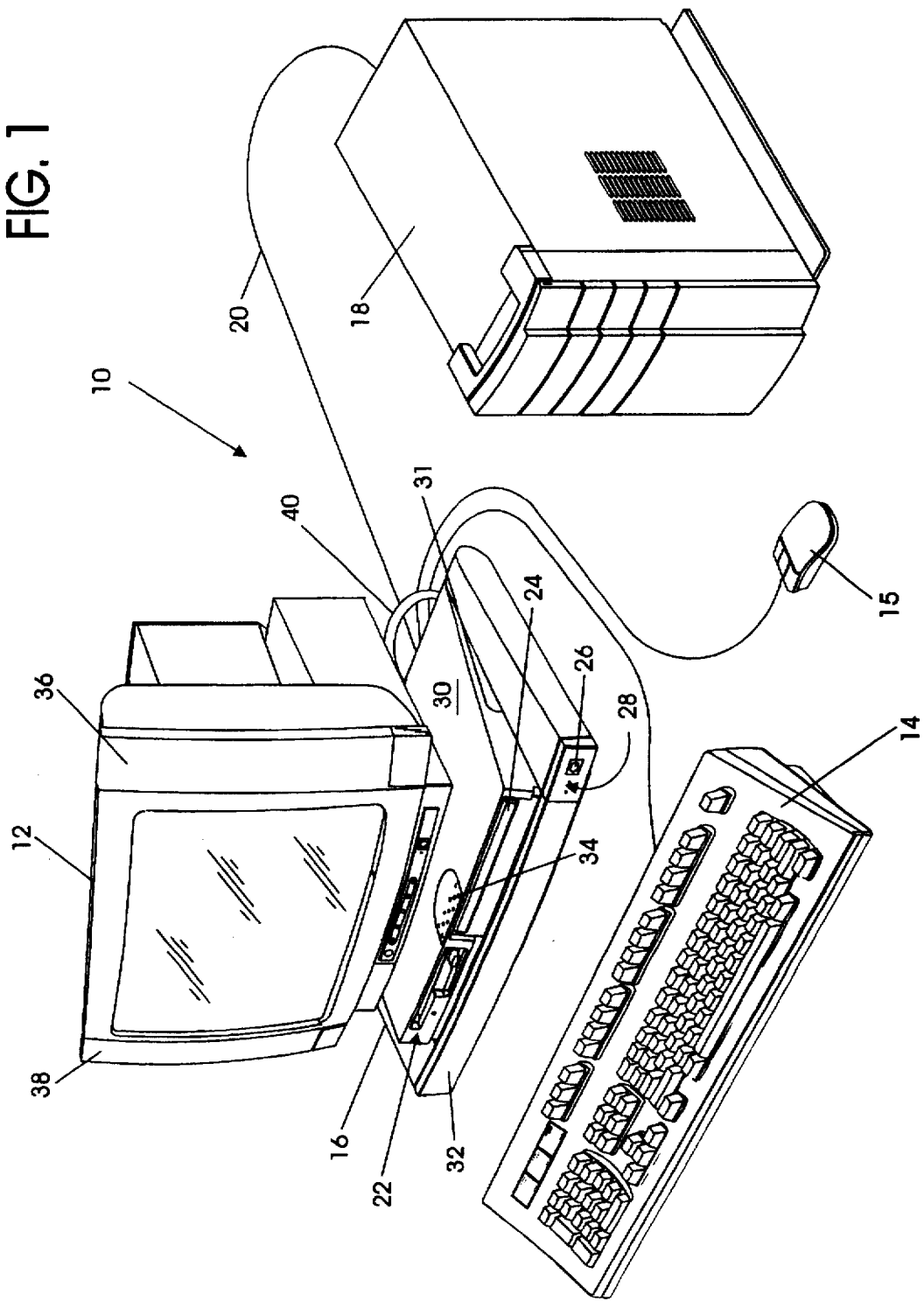
FIG. 1 is a perspective view of a computer system embodying the present invention wherein a drive housing is in an open position.

Referring to the accompanying drawings, a split system personal computer embodying the present invention is there shown and generally indicated at 10 (FIG. 1). The computer system 10 may have an associated monitor 12, keyboard 14, mouse 15 and printer (not shown). The computer 10 includes a media console 16 which is connected to a system or processing unit 18 by a multi-conductor flexible cable 20. The media console 16 can be placed on top of a desk near the monitor 12 and includes all of the user interactive components of the computer system 10 including a floppy disk drive 22, CD-ROM drive 24, power on/off switch 26, status indicators 28 (e.g., power and hard drive activity) and input device ports (e.g., keyboard and mouse). The system unit 18 on the other hand contains all the power, bulky and noisy components that a user does not need to interact with and can be placed under or behind the desk. For example, as will be described in more detail below, the system unit 18 includes a central processing unit (CPU), planar, memory, hard disk drive, expansion bus slots (PCI, ISA), expansion drive bays, power supply, fan(s) and video/graphics subsystem.

Figure 2:
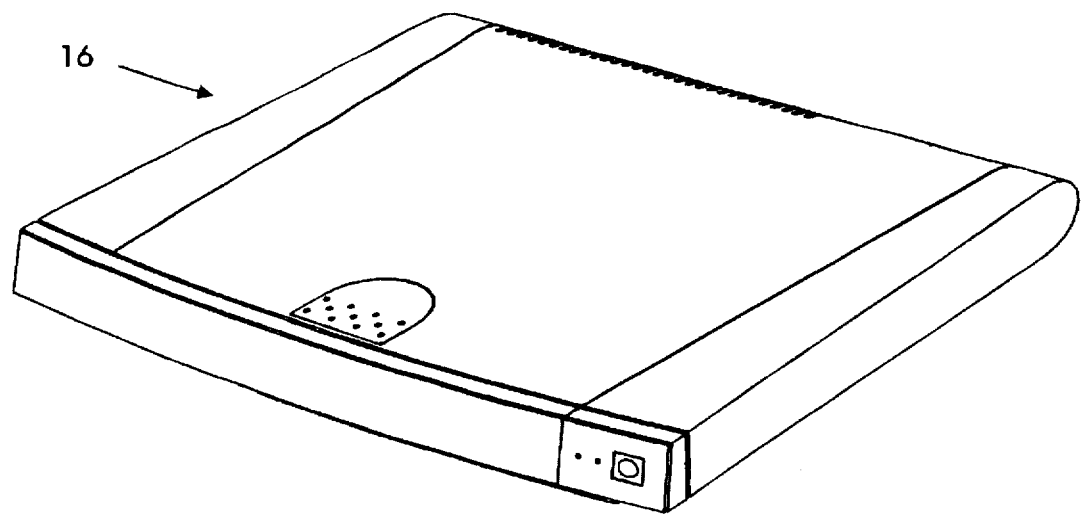
FIG. 2 is a perspective view of the media console of FIG. 1, wherein the drive housing is in a closed position.

The internal mechanical elements (described in more detail below) allow the drive bay housing 30, which contains the floppy disk drive 22 and CD-ROM drive 24, to move between an open position shown in FIG. 1 and a closed position shown in FIG. 2. In the open position, a user can access the openings in floppy disk drive 22 and/or CD-ROM drive 24 to insert/remove a floppy or compact disk respectively as needed. On the other hand, in the closed position, the openings in FDD 22 and CD-ROM drive 24 are concealed with a front panel of the base member 32 and cannot be accessed. In addition, an optional lock (not shown) can be provided on the media console 16 to lock the drive housing 30 in the closed position providing added security to prevent unauthorized access to the drives 22 and 24.

The internal mechanical assembly allows the drive housing 30 to raise from a recess 31 in the console base 32 in one smooth, fluid motion when unlatched and remain supported in the open position (FIG. 1). The drive housing 30 can be raised and unlatched from the closed position (FIG. 2) to the open position (FIG. 1) by a user simply pressing down on the push pad 34, and lowered and latched from the open position to the closed position by a user again pushing down on the push pad 34. This conserves and minimizes space on the desktop, protects the floppy disk drive 22 and CD-ROM drive 24 when in the closed position and also provides easy accessibility of the drives 22 and 24 to the user when needed.

The personal computer system 10 is a split system in that it separates the media components (e.g., floppy disk drive 22 and CD-ROM drive 24) within media console 16 from the central processing unit (CPU), hard drive and power supply which are located within the separate system unit 18. In other words, the computer system 10 removes all the components which a user does not need to interact with away from the desktop work space. As a result, the components which are disposed in the media console 16 on the desktop have a much smaller profile than conventional desktop personal computers. (For example, the dimensions of media console 16 when the drive housing 30 is in the closed position can be 55 mm high, 260 mm deep and 390 mm wide as compared to a conventional desktop unit of dimensions 125 mm high, 435 mm deep and 380 mm deep. Yet, unlike the tower design, all user interaction is made easily accessible on the desktop without the need to reach down to a tower unit. In addition, when the computer 10 is not in use, the keyboard 14 may be stored on top of the media console 16 under the monitor 12 to provide an even more compact system. Moreover, the media console 16 is also very low power compared to the processing unit 18 such that it does not produce excessive heat or require a fan.

The monitor 12 can have multimedia speakers 36 and 38 built into opposite sides of the front thereof or the system 10 can have separately detached speakers (not shown) for providing sound. The monitor 12 can be suspended above the media console 16 with a cantilevered monitor stand 40. The monitor stand 40 is self supportive so the monitor weight is not placed on top of the media console 16 and allows the drive housing 30 to raise unimpeded. The stand 40 fits underneath the opposite ends of the media console 16 to keep the monitor 12 within the same "footprint" space as the media console 16. The stand 40 can be formed from standard tubular steel with a steel plate welded to the top for use in interfacing with the monitor's tilt swivel device (not shown).

Referring now to FIG. 3, there is shown a schematic diagram of the elements which make up the media console 16. As shown therein, the media console 16 includes a movable top cover 42 which cooperates with a base member 32 in defining an enclosed, shielded volume for receiving electrically powered data processing and storage components for processing and storing digital data. More specifically, the storage components include floppy disk drive 22 and CD ROM drive 24. The floppy disk drive 22 can be a removable medium direct access storage device (DASD) capable of receiving a diskette inserted there into and using the diskette to receive, store and deliver data as is generally known. The CD-ROM drive 24 can be a removable medium direct access storage device capable of receiving a compact disk inserted there into and using the disk to deliver data as is generally known. Alternatively, either the floppy disk drive 22 or CD-ROM drive 24 could be replaced with a digital versatile disk (DVD) drive. The FDD 22 and CD-ROM drive 24 are mounted on a direct access storage device bracket 44. The DASD bracket 44 is mounted to the top cover 42 such that the drives 22 and 24 will move with the top cover 42. The top cover 42 includes a user push pad 34 and is disposed between right and left wings 46 and 48 respectively.

User access features and indicators such as a power button 26 and various LEDs 28 (e.g., power light indicator, hard disk drive activity indicator) are included in the media console 16 operator panel 50. A standard keyboard port 52 and mouse port 54 exit the rear of the media console 16. A media console electronics card 56 is disposed within the console housing 30 and is coupled to the floppy disk drive 22 and CD ROM drive 24. The card 56 is also connected to multi-conductor cable 20 via connector 58. As will be described in more detail below, the electronics card 56, in cooperation with an interface in the processing unit 18, is used to receive address and data information from the processing unit 18 and to transfer interrupt state information to the processing unit 18.

Figure 4:
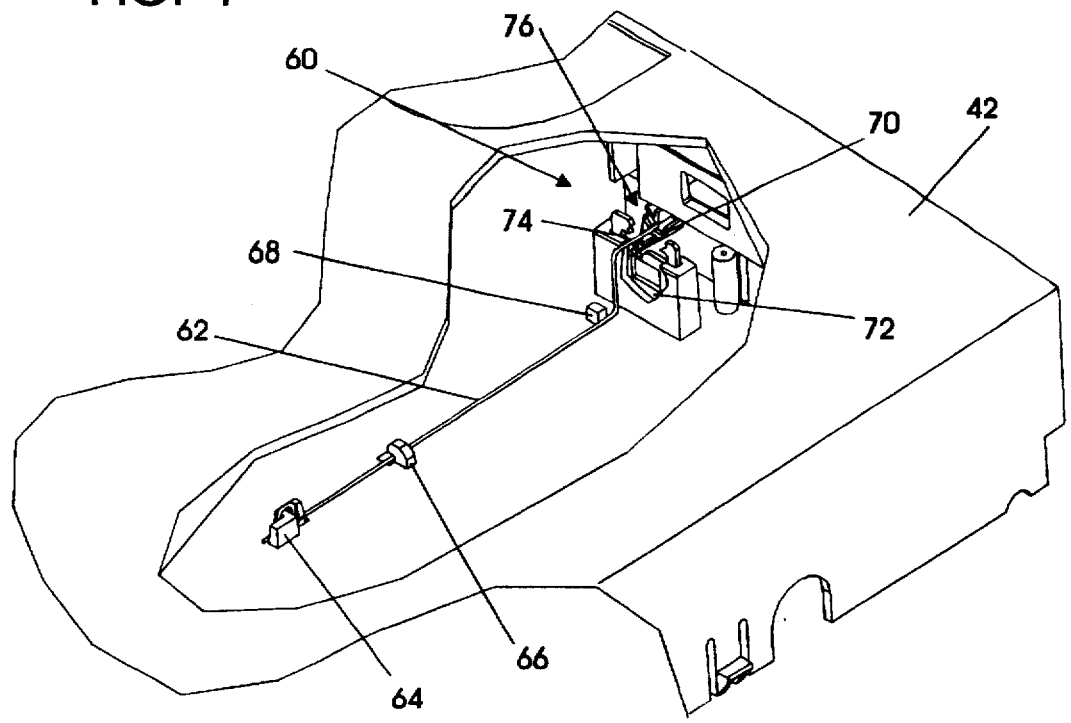
FIG. 4 is a cut-away perspective view of the media console showing the latch of FIG. 3.
Figure 5:
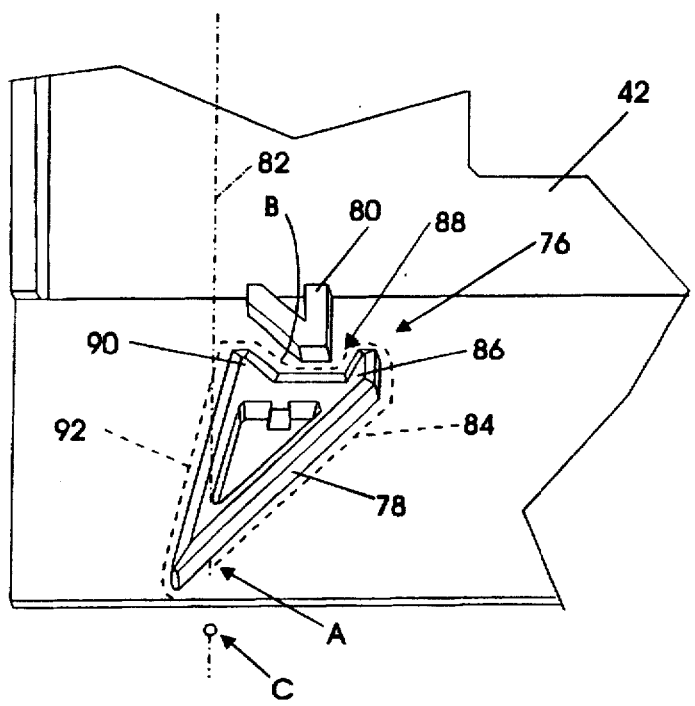
FIG. 5 is an enlarged view of the track portion of the latch of FIG. 4.

Referring now to FIGS. 3-5, there is shown schematic diagrams of the integrated latch 60 for latching the console drive housing 30 in the closed position and unlatching the top housing 30 to allow the housing 30 to move to the open position. The latch 60 includes a wire form latch pin 62 that is attached to the bottom of the console base 32 by three supports 64, 66 and 68. The first support 64 attaches the wire 62 to the base 32. The second support 66 is used to prevent the wire 62 from moving vertically up or down and horizontally to the right. The third support 68 prevents the wire 62 from moving horizontally to the left. Accordingly, all three supports 64, 66 and 68 cooperate with each other to secure latch wire 62 to the base 32 and prevent it from moving vertically or horizontally. In addition, the wire 62 is made of a flexible material such that when a horizontal force is exerted on the end 70 of the latch wire 62 the three supports 64, 66 and 68 serve as positioning elements to center and bias the latch wire 62 when undeflected in a preselected position. A support bar 72 having a groove 74 therein supports the wire end portion 70 and allows horizontal movement thereof.

The latch 60 further includes a track 76 which is integral with and protrudes from inside the console top cover 42. The track 76 includes a lower triangular track 78 and an upper notch 80. The dashed line 82 shows the equilibrium or center position of wire end 70 (i.e., the position of wire end 70 when no external forces are exerted thereon).

In operation, as the top cover 42 is moved from the open position to the closed position, the wire end portion 70 contacts the track 78 at A and travels along path 84 and then comes to rest at position B. As the wire end 70 travels along path 84 the track 78 pushes the end 70 to the right but since the wire is trying to return to its center position 82, the wire end 70 will ride adjacent track 78 in path 84. Once the wire end 70 passes the first nub 86 it will move to the left and into 88 and then finally resting and being held at position B by second nub 90 and its spring force pushing the end 70 toward the center position 82 into nub 92. At position B the top cover 42 is latched in the closed position as the upward force exerted by top cover 42 and track 78 is stopped by the wire end 70.

To unlatch the top cover 42, a user presses on the pad 34 and as the top cover 42 is moved from the closed position to the open position, the notch 80 and track 78 will first move downward and the wire end 70 will move toward its center position 82. Once the second nub 90 of track 78 is below the horizontal level of the wire end 70, the end 70 will move to center line 82. The top cover 42 then moves upward by the raise/support assembly (described below) and the wire end 70 travels along path 92 and then come to rest at position C. The wire end is at its center position at position C and the cover 42 is fully open.

The integrated latch assembly 60 provides positive latching without additional, discrete latching parts which provides for simple, error-free, and consistent latch operation while also minimizing the number of moving parts.

Referring now to FIGS. 3 and 6, there is shown schematic diagrams of the raise/support assembly 100 which allows the drive housing 30 (FIGS. 1-3) to reside within the main console base 32 when latched and raise in a smooth, fluid motion from the console base 32 when unlatched and remain supported in the open position in accordance with the present invention. In addition, the raise/support assembly 100 provides the resiliency that a user feels when pushing on the push pad 34 when moving the drive housing 30 from the open position to the closed position. The assembly 100 includes a wire form spring 102 held in place by the tab 104 in console base 32 and holes 106 in DASD bracket 44 of the console top cover 42, the latter of which attaches the ends 108 of spring 102 to the drive housing 30. The spring 102 provides the lifting force to raise the housing 30 when unlatched. The spring 102 has a non-linear force profile (i.e., the spring does not compress linearly with position of the housing 30). One type of non-linear force profile is where the spring 102 has approximately equal force at the open and closed positions but has less force therebetween (e.g., a bi-center or bi-polar spring). Another type of non-linear force profile is where the spring 102 has more upward force in the open position than in the closed position or vice-versa. Either of these profiles can be used in the present invention and the discussion below will use the latter profile as an example.

The spring 102 is biased toward position D and in cooperation with snap tabs 110 support and hold the top cover in the open position when unlatched. When the drive housing 30 is in the closed (latched) position the spring end 108 is at position E and is exerting an upward force on drive housing 30 but the housing is prevented from moving up to the open position by the push-push latch 60 described above.

Hinge pins 112 (FIG. 3) at the rear of the top cover 42 fit within grooves 114 in the base 32 and cooperate with each other to provide the pivot point for the drive housing 30. Snap tabs 110 on each side of the top cover 42 provide a hard stop for the housing 30 under load from the spring 102 when moved to the open position. When moving the drive housing 30 into the closed position, the front of the drive housing abuts a front ledge of the base member 32 to prevent any further downward movement of the housing 30.

Centrifugal geared dampers 116 are attached to each end of the console top cover 42 by platform members 118 and a screw 120 (see FIG. 3) inserted into the opening on the platform member 118 and into a boss (not shown) in the top cover 42. The geared dampers 116 control the speed of ascent of the drive housing 30 and dampen spring oscillations. Each damper 116 includes platform member 118 which holds circular roller 122 allows it to freely rotate. The circular roller 122 is held by circular edges 123 of the platform member 118. The rollers 122 includes an integral gear 124 which rides along a cooperating radiused gear track 126 when the top cover moves up or down. The gear track 126 is designed to match an arc of a moving point rotating about a fixed pivot point since the drive housing 30 pivots about the fixed hinge pins 112 and grooves 114. The radiused design of gear track 126 allows the damper 116 to flow smoothly when the housing 30 is opened or closed.

In operation, when the drive housing 30 is latched in the closed position, the spring end 108 is at position E exerting an upward force but held closed by the latch 60. When a user presses down on push pad 34, the housing 30 is unlatched (as described above) and the spring end 108 exerts an upward force on the housing 30 as it moves from position E to position D and the dampers 116 cushion and smooth out that movement as they move from position F to position G along the gear track 126. The drive housing 30 is then held in the open position by spring ends 108 and the snap tabs 110 prevent the housing 30 from going up any further. Thus, the spring 102, geared dampers 116 and gear tracks 126 provide a raise/support assembly which allows the drive housing 30 to move smoothly from the closed position to the open position when housing 30 is unlatched.

To close the drive housing 30, a user presses on the pad 34 with a sufficient force to overcome the upward force of spring 102. This will move the spring ends 108 from position D to slightly past position E as the dampers 116 move from position G to slightly past position F and the front ledge of the base member 32 prevents any further downward movement of cover 42. The spring ends 108 and dampers 116 will then move to position E and F respectively and the housing 30 will be latched in the closed position by latch 60 (described above).

The raise/support assembly 100 of the present invention allows the drive housing 30 to reside within the main console base 32 when latched, but raise in a smooth, fluid motion from the console base 32 when unlatched and remain supported in the open position. The assembly 100 is based on a wire form spring 102 that provides significant function without requiring several moving parts or linkages thus providing a low complexity of assembly. The damper action against molded-in gear racks 126 provide effective dampening and consistent control of the housing 30 ascent with minimal complexity of design.

Referring now to FIG. 7, there is shown a schematic diagram of the tower type system unit 18 of the present invention. As mentioned above, the processing unit 18 is designed to be placed on the floor and contains system components which the user does not need to interact with regularly. More specifically, the system unit 18 contains the remainder of the computer components including a microprocessor, memory, video/graphics subsystem, hard disk drive(s), expansion bus slots (PCI/ISA), expansion drive bays, power supply and fan(s). Accordingly, the processing unit 18 contains all of the high power, bulky and noisy components that the user does not need to interact with. Unless the user chooses to install an accessible drive (like a 5.25" floppy drive or tape backup unit) the processing unit can be completely hidden from view. The multi-conductor electrical cable 20 connecting the processing unit 18 and the media console 16 allows the processing unit 18 to be placed along side, underneath or even behind the desk supporting the media console 16, or in a different room or office than the media console 16.

More specifically, the system unit 18 includes an internal mounting or base chassis assembly 130 disposed within an outer decorative cover 132. Cover 132 has a handle to allow for easy carrying or moving of the tower type processing unit 18. A power supply 134 for supplying power to both the processing unit 18 and the media console 16 is disposed within an upper portion of the assembly 130. A hard disk drive 136 is attached to the top of the assembly 130 by screws 138. The hard disk drive 136 is a fixed medium direct access storage device capable of storing and delivering data as is generally known. A planar 140 is mounted vertically in the right side portion of assembly 130 and includes a central processing unit (CPU) 142, ports 144 for connecting additional RAM memory and a riser card port 146 for connecting a riser card 148. The planar 140 provides a means for electrically interconnecting the components of the computer 10 including those identified above. The system unit 18 also includes a modem/sound card 150 coupled to an expansion bus slot (see FIG. 9A). An expansion bus interface card 152 is disposed within the assembly 130 and is coupled between another expansion bus slot and the multi-conductor cable 20. The interface card 152 will be described in more detail below.

System unit 18 also includes a fan (not shown) disposed behind fan vent 154 for cooling the components of system unit 18 such as the CPU 142, graphics controller, hard disk drive 136 and power supply 134. Since the tower or base unit 18 is meant to be placed under a table or desk, the volume of the enclosure is less critical (1) allowing the fan inside to circulate air inside the unit 18 rather than through it allowing for quieter cooling and (2) allowing the unit 18 to be cooled with optional heat pipes (not shown) that bring the heat to outer surfaces of the box.

A television card 156 is also disposed within processing unit 18 and coupled to an expansion bus slot (FIG. 9A). The TV card 156 allows standard television signals from a coaxial cable or composite video input to be tuned and subsequently displayed in a window on the monitor 12. A 40 pin ribbon cable 158 is used to couple the output of the TV card 156 to the graphics subsystem. An electromagnetic interference (EMI) shield 160 is disposed between the cover 132 and chassis 130.

The processing unit 18 includes other elements which are conventional and as such are not described herein.

Figure 8:
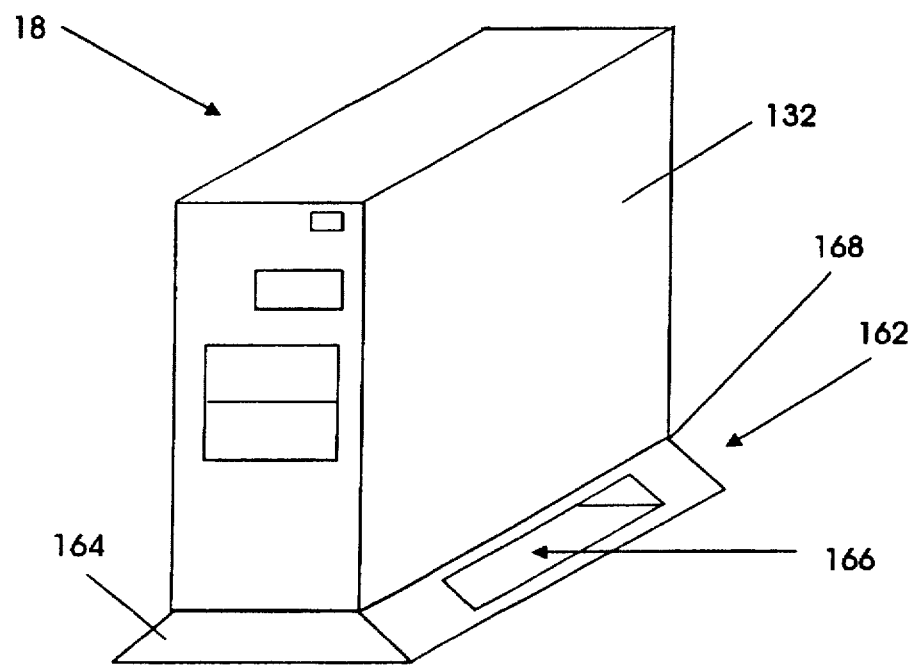
FIG. 8 is a perspective view of an alternative embodiment of the processing unit of the present invention.

Referring now to FIG. 8, there is shown an alternative embodiment of the processing unit 18 wherein a subwoofer 162 has been integrated therein. The subwoofer 162 is integral with the system unit 18 and is disposed at a bottom thereof. The subwoofer 162 fits under the cover 132 and is part of the system unit's base 164. The subwoofer includes a vent 166 on at least one side of the base 164 for allowing acoustic energy to escape. A shield 168 is disposed between the hard disk drive 136 and the subwoofer 162 for shielding a magnetic field that emanates from the subwoofer's magnet. The shield 168 can be made of a metal such as for example, mumetal, aluminum or iron.

The addition of the integrated subwoofer 162 to the processing unit 18 has the added advantage of saving space by reducing the number of separate system components (i.e., combining system unit and subwoofer), reduces complexity and connections for the end user. In addition, the integrated subwoofer 162 reduces cost by sharing the same enclosure and system power supply.

Figure 9C:
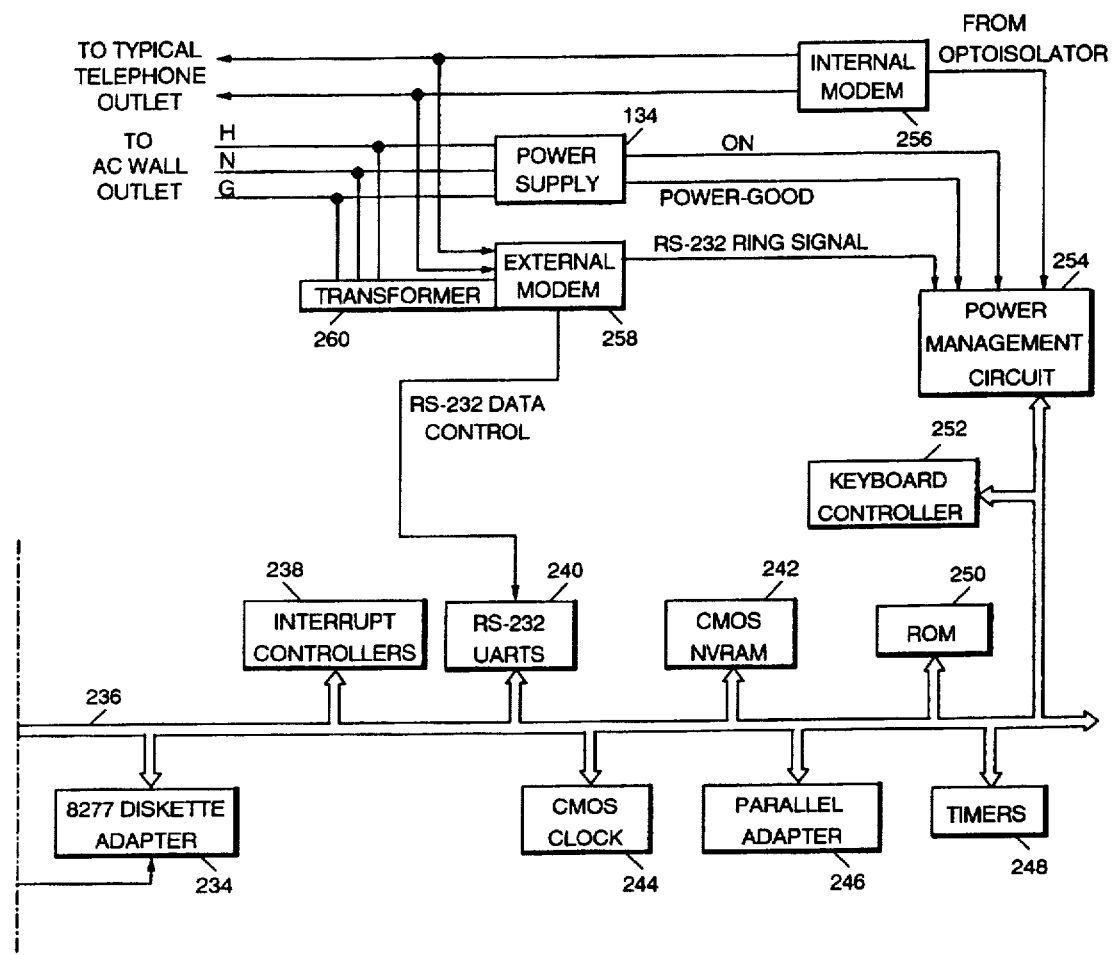

Prior to relating the above structure to the present invention, a summary of the operation in general of the personal computer system 10 may merit review. Referring to FIGS. 9A–9C, there is shown a block diagram of a personal computer system illustrating the various components of the computer system such as the system 10 in accordance with the present invention, including components mounted on the planar 140 and the connection of the planar to the I/O slots and other hardware of the personal computer system. Connected to the planar 140 is the system CPU or processor 142 which is connected by a high speed CPU local bus 170 through a memory control unit 172, which is further connected to a volatile random access memory (RAM) 174. The memory control unit 172 is comprised of a memory controller 176, an address multiplexer 178, and a data buffer 180. The memory control unit 172 is further connected to RAM 174 as represented by the four RAM modules 182. The memory controller 176 includes the logic for mapping addresses to and from the microprocessor 142 to particular areas of RAM 174. This logic is used to reclaim RAM previously occupied by basic input output system (BIOS). Further generated by memory controller 176 is a ROM select signal (ROMSEL), that is used to enable or disable ROM.

While the present invention is described hereinafter with particular reference to the system block diagram of FIGS. 9A–9C, it is to be understood at the outset of the description which follows that it is contemplated that the apparatus and methods in accordance with the present invention may be used with other hardware configurations of the planar board. For example, the system processor 142 could be an Intel PENTIUM processor, Cyrix 586-P75 processor or Advanced Micro Devices 8486 processor or any other suitable microprocessor.

Returning now to FIGS. 9A–9C, the CPU local bus 170 (comprising data, address and control components, not shown) provides for the connection of the microprocessor 142, a math coprocessor 184 (if not internal to the CPU 142), a system cache memory 186, and a cache controller 188. Also coupled on the CPU local bus 170 is a core chipset 190 which includes a peripheral component interconnect (PCI) bridge and an integrated drive electronics (IDE) fixed disk controller. The core chipset 190 can be an Intel Triton VX chip and an Intel PIIX3 chip. The PCI bridge within chipset 190 provides an interface between the local bus 170 and a PCI bus 196. Connected to the PCI bus 196 are a plurality of I/O slots 198 for receiving peripheral devices, one of which is a video controller 200. The video controller 200 has associated with it a monitor (or video display terminal) 12 and a video memory 202.

The chipset 190 is itself connected to a slower speed (compared to the CPU local bus 170) system bus 204, also comprising address, data and control components. The system bus 204 extends between the chipset 190 and a buffer 206. The system bus 204 is further connected to a bus control and timing unit 208 and a DMA unit 210. The DMA unit 210 is comprised of a central arbiter 212 and a DMA controller 214. An additional buffer 216 provides an interface between the system bus 204 and an optional feature or expansion bus 218 such as the Industry Standard Architecture (ISA) bus. Connected to the bus 218 are a plurality of I/O slots 220 for receiving ISA adapter cards, one of which is a host interface ISA card 152 (another of which is the modem/sound card 150). Additional ISA adapter cards can be pluggably connected to the I/O slots 220 and may provide additional I/O devices or memory for the system 10. The host card 152 is connected by the multi-conductor cable 20 to the electronic card 56 which is disposed in the media console 16. The host card 152, cable 20 and console electronics card 56 will be described in more detail below. It is sufficient at this point to note that the electronics card 56 includes a de-multiplexer 222 which is coupled to a keyboard controller 224, a 8277 diskette adapter 226 and an IDE disk controller 228 via bus 230. The keyboard controller 224, is the slave processor that interfaces with the keyboard 14 and the mouse 15. The de-multiplexer 222 is also coupled to the power switch 26 and the power/feedback LED 28. The keyboard controller 224, FDD controller 226 and IDE disk controller 228 can all be included in a single super I/O circuit such as for example, a SMC37C932 chip.

An arbitration control bus 232 couples the DMA controller 214 and central arbiter 212 to the I/O slots 220 and another diskette adapter 234.

While the microcomputer system 10 is shown with a basic 8 megabyte RAM module 174, it is understood that additional memory can be interconnected as represented in FIGS. 9A and 9B by the addition of optional higher-density memory modules 182. For purposes of illustration only, the present invention is described with reference to the basic eight megabyte memory module.

A latch buffer and decoder 206 is coupled between the system bus 204 and a planar I/O bus 236. The planar I/O bus 236 includes address, data, and control components respectively. Coupled along the planar I/O bus 236 are a variety of I/O adapters and other components such as the diskette adapter 234, an interrupt controller 238, an RS-232 adapter 240, nonvolatile CMOS RAM 242, also herein referred to as NVRAM 242, a CMOS real-time clock (RTC) 244, a parallel adapter 246, a plurality of timers 248, the read only memory (ROM) 250, the keyboard controller 252, and the power management circuitry 254. The keyboard controller 252 and diskette adapter 234 are duplicated in the media console 16 (keyboard controller 224 and diskette adapter 226 respectively) in order to allow additional diskette drives or tape drives to be installed in the system unit 18 (via 234), or the keyboard and mouse can be plugged into the system unit 18 instead of the console 16 (via 252). In addition, the duplication allows the same planar to be used without such a console 16. The power management circuitry 254 is in circuit communication with the power supply 134, the switch 26, the power/feedback LED 28, and an internal modem 256 and/or an external modem 258. The external modem 258 is typically connected to a transformer 260, which is connected to a typical wall outlet, as is known to those skilled in the art. The modems 256, 258 are connected to a typical telephone outlet.

The read only memory 250 includes the BIOS that is used to interface between the I/O devices and the operating system of the microprocessor 142. BIOS stored in ROM 250 can be copied into RAM 174 to decrease the execution time of BIOS. ROM 250 is further responsive (via ROMSEL signal) to memory controller 176. If ROM 250 is enabled by memory controller 176, BIOS is executed out of ROM 250. If ROM 250 is disabled by memory controller 176, ROM is not responsive to address inquiries from the microprocessor 142 (i.e. BIOS is executed out of RAM).

The real-time clock 244 is used for time of day calculations and the NVRAM 242 is used to store system configuration data. That is, the NVRAM 242 will contain values which describe the present configuration of the system 10.

For example, NVRAM 242 contains information describing the capacity of a fixed disk or diskette, the type of display, the amount of memory, time, date, etc. Furthermore, these data are stored in NVRAM 242 whenever a special configuration program, such as SET Configuration, is executed. The purpose of the SET Configuration program is to store values characterizing the configuration of the system to NVRAM 242.

The interface card 152, multi-conductor cable 20 and media electronics card 56 will now be described with reference to FIGS. 10-14. The ISA interface card 152 allows IDE controller 228, FDD controller 226 and 8042 keyboard controller 224 to be used in the media console 16. The ISA card 152 which is plugged into the base system unit 18 can be programmed to decode certain ranges of I/O addresses. The BIOS ensures that the proper I/O ranges for the devices in the console 16 ("split" devices) are enabled and that possibly conflicting planar devices are disabled. When the interface card 152 detects a valid input/output (I/O) or direct memory access (DMA) cycle for a split device, it intercepts the cycle and issues the I/O (or DMA) cycle to the media console 16 electronics card 56 which responds to the I/O (or DMA) cycle.

A multiplexing scheme was developed to multiplex address, data, and interrupts in order to keep the number of signals in the cable 20 to a reasonable number. In addition to the multiplexed I/O signals, some other signals had to be brought up independently—auxiliary 5 volts, the power light indicator signal, and the power switch signal. These signals must be separate because they must be active even when the main power is off.

The present invention provides a generic ISA bus I/O extender interface that minimizes the number of signals needed to transfer data, address and interrupts between devices in the consol 16 and devices n the system unit 18. In addition, the present invention allows the media console 16 electronics to be based around a super I/O device 286 that contains the IDE, FDD and keyboard controllers 228, 226 and 224 respectively. In addition, new devices could easily be added simply by adding the appropriate decode range to the base card and adding the ISA device to the media console 16 with no changes to the cable 20 protocol.

Figure 10:
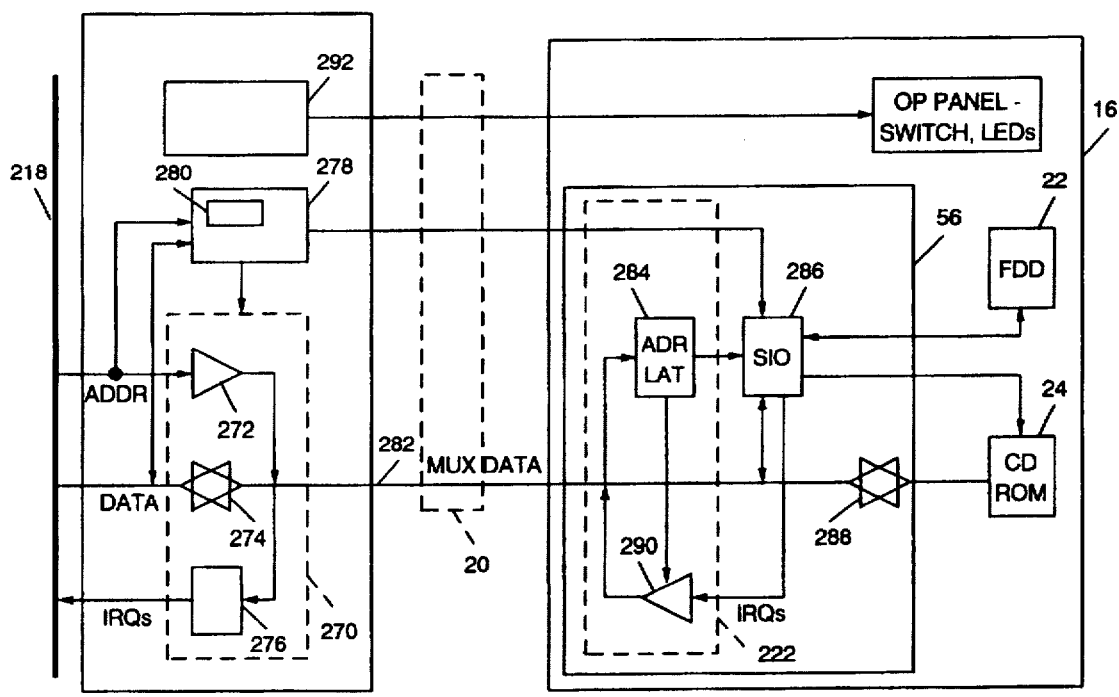
FIG. 10 is a schematic block diagram of the ISA interface electronic card, cable and media console electronic card of the present invention.

Referring now to FIG. 10, there is shown a schematic diagram of the ISA interface card 152, the media card 56 and the coupling therebetween via the multiconductor cable 20. The interface card 152 includes a multiplexer 270 for multiplexing addresses from the ISA bus 218, data to/from the ISA bus 218 and interrupt requests (IRQs) from the console 16 to the ISA bus 218. Multiplexer 270 includes a tristateable address driver 272 coupled to the address signals of ISA bus 218, a tristateable transceiver 274 coupled to the data signals of ISA bus 218 and an IRQ latch 276 coupled to the control portion of ISA bus 218. A sequencer or control circuit 278 is coupled to the address and data signals of the ISA bus 218 and multiplexer 270. Configuration registers 280 are used by BIOS to enable the appropriate I/O address ranges and DMA channels for the sequencer 278 to pass through to the media console 16. A description of the registers 280 and an unlocking/locking sequence is described below.

The sequencer 278 constantly monitors the ISA bus 218 waiting for I/O or DMA cycles that it must act upon. During ISA bus idle times, the address signals are constantly driven through the multi-conductor cable 20 to the media console 16. When the sequencer 278 detects an I/O cycle that needs to be passed through to the media console 16, the address enable signal (ADR_EN) is deasserted to latch the address into the media console 16 and tristate the cable data bus 282 (MUX DATA). Next, the data enable (DAT_EN#) is asserted to enable the data transceivers to pass the data to/from the media console 16 across the multi-conductor cable data bus 282.

At the end of each I/O and DMA cycle (even those not decoded) as well as memory refresh cycles, the sequencer 278 samples the 8 IRQ signals that the media console 16 is capable of generating (IRQs 1, 3, 6, 9, 11, 12 14 and 15). The media console 16 was designed to only generate 8 IRQs and allow a single byte to be transmitted. It should be understood that the media console 16 could be designed to generate 16 IRQs but this would increase cost. The 8 IRQs chosen are typical ones used by the devices in the console 16 (e.g., IRQ1 for the keyboard 14, IRQ6 for the floppy disk drive 22, IRQ 12 for the mouse 15 and IRQ15 for the CD-ROM 24. Extra IRQs (IRQs 3, 9, 11 and 14) are included to allow a Plug-n-Play operating system to reconfigure the IRQs. The sequencer 278 activates the IRQ strobe signal (IRQ_STRB#) for one clock cycle. In response to this signal, the media console 16 drives the current state of the interrupts onto the cable data bus 282. The IRQ latch 276 then latches the interrupt states and drives them onto the ISA channel with open collector drivers. This IRQ cycle overlaps the ISA bus I/O recovery time so that there is no performance penalty. No interrupts are lost since all devices generate interrupts in a level triggered fashion. An interrupt never occurs as a short pulse as they are always latched by the generating device and it requires action by the CPU 142 (usually reading a status I/O port) to clear the IRQ.

The electronics card 56 in the media console 16 is an I/O bus demultiplexer. The demultiplexer 222 includes an address latch 284 for latching the addresses from the base card 152. A super I/O device (SIO) (e.g., SMC 37C932) 286 is coupled to the address latch 284, the FDD 22, the CD-ROM 24, the sequencer 278, the tristateable transceiver 288 and the IRQ tristateable buffer 290. As noted above, the SIO device 286 contains the diskette adapter 226 and IDE disk controller 228 for the floppy disk drive 22 and CD-ROM drive 24 respectively. The demultiplexer 222 is a slave to the sequencer 278 in the base card 152. More specifically, the demultiplexer 222 responds to the address enable (ADR_EN) and data enable (DAT_EN#) signals generated by the sequencer 278 and the IRQ strobe (IRQ_STRB#) signal also generated by the sequencer 278 to latch/drive the appropriate signal groups.

The output of the demultiplexer 222 is a pseudo ISA bus in that it does not support all I/O addresses, memory cycles, master cycle etc. but rather only carries certain I/O address ranges. In addition, this pseudo ISA bus only carries up to 3 DMA channels and 8 IRQ signals. One DMA channel (channel 2) is used for the floppy disk drive 22 and the other two channels are spares. The 3 DMA channels and 8 IRQs were chosen to be sufficient for the devices currently in the console 16 and allow upgrades as well with the unused DMA channels and IRQs. Of course, more DMA channels and IRQs would require more conductors in the cable 20. The setup and hold timings for the pseudo ISA bus are slightly more stringent than the ISA bus 218. The timing restrictions are due to the additional propagation delays through the buffers and cable 20. The super I/O integrated circuits available today have much less setup and hold specifications than the original ISA bus allowed for. This allows the split system 10 of the present invention to operate with no additional wait states.

The host interface card 152 is configured to pass the appropriate I/O addresses through to the media console 16.

In addition, the console 16 is programmed to respond to the appropriate addresses as well. It should be noted that interrupt request levels do not need to be programmed as they are automatically passed through from the media console as they are generated. This is possible because they are driven back to the ISA bus 218 using open collector drivers (i.e., output of IRQ latch 276).

The sequencer 278 is configured through a pair of 8 bit I/O ports or registers 280 within sequencer 278; a first I/O port (CFG_ADDR) at address 370H and a second I/O port (CFG_DATA) at address 371H. The CFG_ADDR register is a write only register which is used to open and close the configuration space and to select one of the configuration registers. Bits 0–3 of this register are Index bits and bits 4–7 are unused. The CFG_DATA register is a read/write register used to access the configuration register currently specified by CFG_ADDR. Bits 0–3 of this register are used for data and bits 4–7 are unused.

The configuration registers are unlocked by writing the following sequence to the CFG_ADDR register: "0DH", "0CH". The logic within sequencer 278 enters the first stage of the unlock sequence after the "0DH" is received. It is important that the "0CH" be received immediately afterwards because any other output cycle (even to another I/O port) will reset the lock. Once unlocked, the configuration registers 280 can be accessed until the locking key ("0FH") is received. Also when the configuration is unlocked, any configured decodes are disabled.

The following configuration registers 280 are used to select the appropriate I/O and DMA cycles to route through to the media console 16:

| IDE_MISC | index 0 | Default = 0 |
|---|---|---|
| | Bit 1 ... 0 | 00 - Enable no IDE |
| | | 01 - Enable IDE1: 1F0H–1F7H, 3F6H |
| | | 10 - Enable IDE2: 170H–177H, 376H |
| | | 11 - Enable IDE3: 1E0H–1E7H, 3E6H |
| | Bit 2 | Enable programmed I/O ranges. "0" means computer system IF is off. |

| FDD_DCD | index 1 | Default = 0 |
|---|---|---|
| | Bit 0 | Enable FDD1: 3F0H–3F7H |
| | Bit 1 | Enable FDD2: 370H–377H |
| | Bit 2 | Enable SMI generation on write to FDD control port. This bit is cleared when the SMI occurs. This bit also enables shadow writes to the FDD1 address range even when bit 0 = 0. |

| DMA_ACK | index 2 | Default = 0 |
|---|---|---|
| | Bit 1 ... 0 | 00 - Enable no DACK cycles |
| | | 01 - Enable DACK0 cycles |
| | | 10 - Enable DACK1 cycles |
| | | 11 - Enable DACK2 cycles |
| | Bit 2 | Enable all I/O address ranges (use for configuration only). |

| KBM_DCD | index 3 | Default = 0 |
|---|---|---|
| | Bit 0 | Enable 8042 I/O address ranges. This bit also automatically enables SMIs for reset/A20 emulation (SMI occurs for writes of X1, XC, XD, XE, XF to "64"). The bit is cleared when the SMI occurs. Enable SMIs |
| | Bit 1 | on writes to port "60". The bit is cleared when the SMI occurs. |

Figure 11:
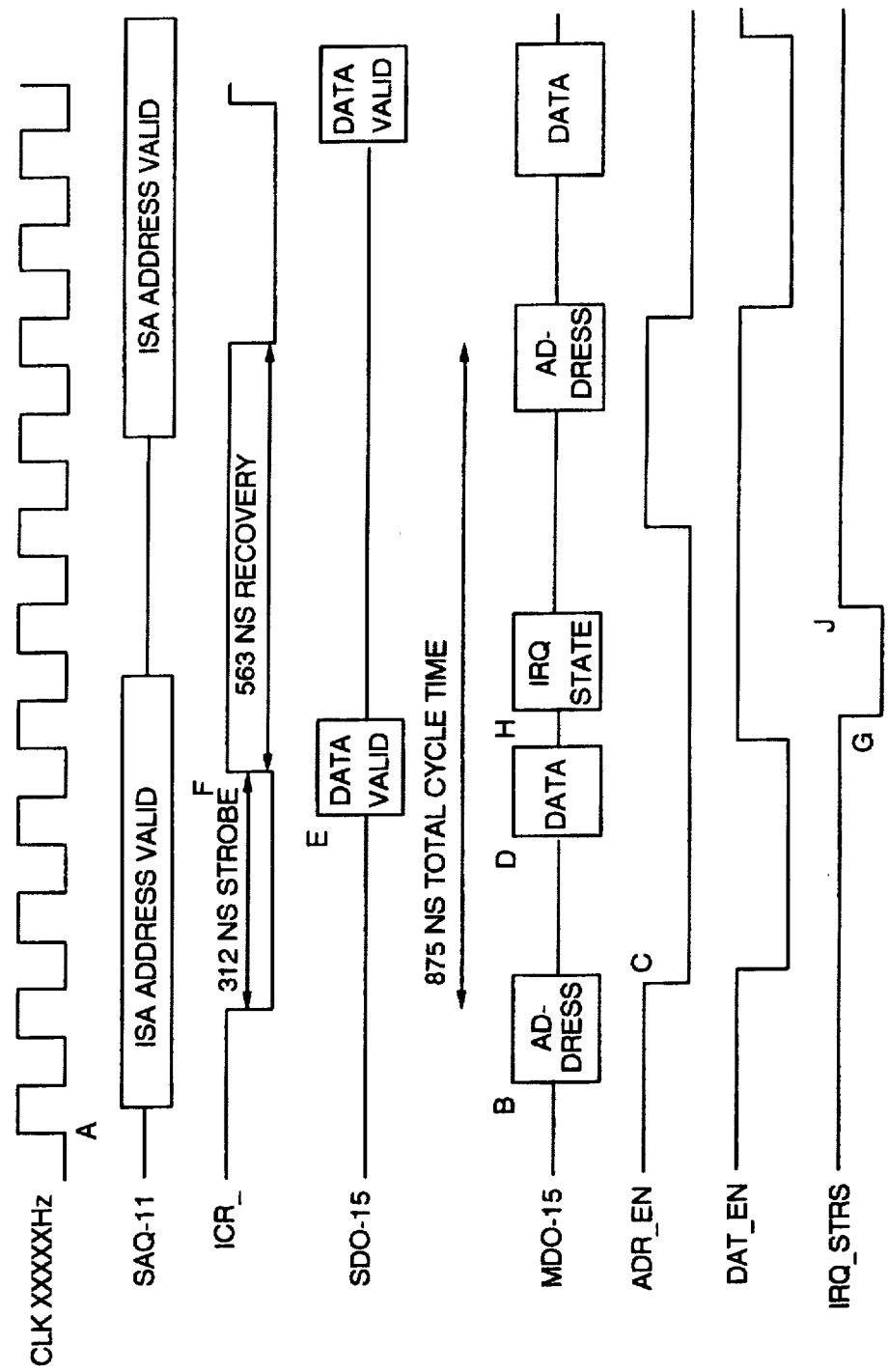
FIG. 11 is a cycle timing diagram of a block read I/O cycle between the ISA interface in the system unit and the CD-ROM drive of the media console via the connecting electrical cable.

Turning now to FIG. 11, there is shown a cycle timing diagram of a 16 bit I/O cycle through the ISA interface of the present invention. The cycle timing is characteristic of a block read of data from the CD ROM 24. More specifically, a device in system unit 18 generates an ISA address at A. The sequencer 278 detects that this is an ISA address directed to the media console 16. As stated above, the sequencer 278, during bus idle times constantly drives the address signals through the cable 20 to the media console 16. Accordingly, at point B the multiplexer 270 provides the ISA address to the media console electronics card 56 via the cable 20. At C the sequencer 278 deasserts the ADR_EN to latch the address into the media console 16 and tristate the cable data bus. Next, the demultiplexer 222 switches to provide data on its output at D, the data is then transferred to ISA bus 218 at E, and the device requesting the data then latches the data at point F. The I/O read cycle also ends at F when the requesting device driving the ISA bus 218 deasserts the IOR_ signal. The sequencer 278 then activates IRQ_STRB# for one cycle at G. In response thereto the media console electronics card 56 drives the current state of the interrupts onto the cable data bus at H. The IRQ states are latched into IRQ latch 276 at point J.

As shown in FIG. 11, the I/O read cycle takes 312 nsec and the recovery takes 563 nsec to yield a total cycle time of 875 nsec for a 16 bit IO read. This yields a maximum sustained transfer rate of 2.3 MB/sec.

The main connection between the host interface 152 and the planar 140 is the ISA bus 218 itself. All ISA bus signals used are buffered appropriately so that the multi-conductor cable 20 and media console 16 do not adversely affect the ISA bus loading. There are a few other signals that must be picked up from sources other than the ISA bus 218. As noted above, these signals include AUX5, the power light indicator signal and the power switch signal. The red book audio interface from the CD-ROM 24 is included in the multi-conductor cable 20 and made available on the host interface card 152. The connector has been chosen such that the same cable that is currently used to connect the CD and sound card can be used between the host interface card 152 and sound card. Various other signals are required from the planar. Many of these are available through existing planar connections. However, to reduce the number of discrete jumper cables required and ease assembly of the system unit 20, all necessary signals have been incorporated into a single 10 pin (2×5) connector on the planar 140 which is connected to planar connector 292 on the ISA card 152. Each of the signals of the 10 pin connector along with their function description are shown in the table of FIG. 12.

Figure 13:
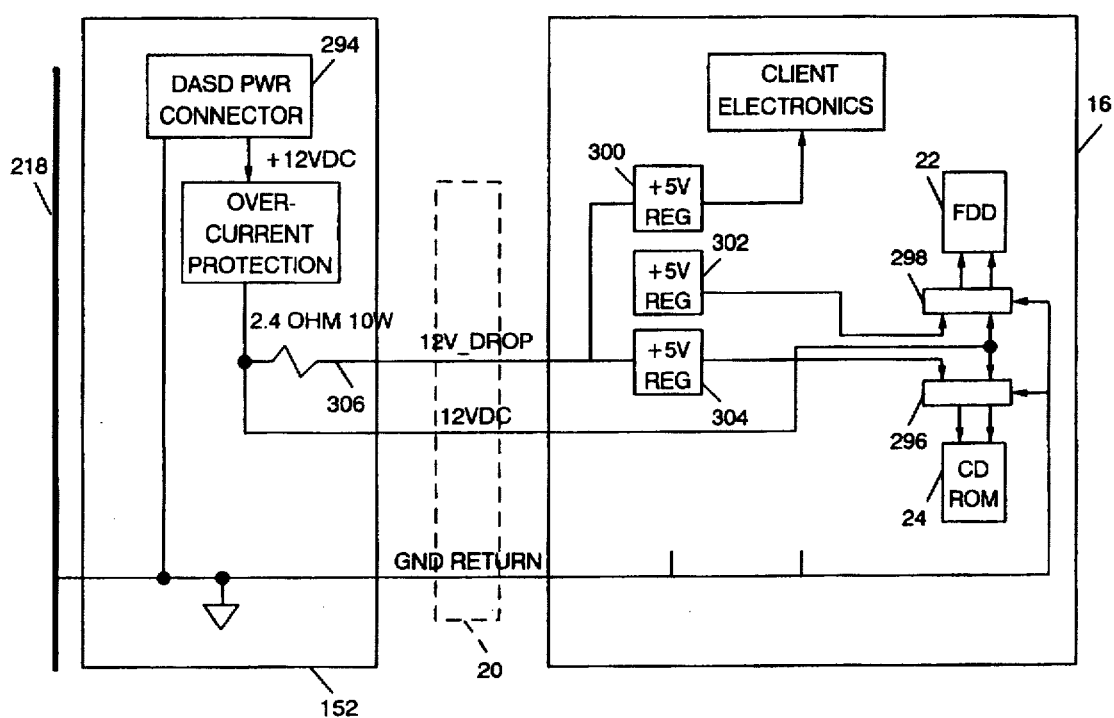
FIG. 13 is a schematic diagram of the power distribution between the ISA interface card and media console electronics card of the present invention.

Turning now to FIG. 13, there is shown a power distribution between the host interface card 152 and media electronics card 56 of the present invention. Since the media console 16 is powered through the multi-conductor cable 20, the necessary voltage (+12VDC) is obtained by using one of the large DASD connectors 294 from the power supply. This avoids the potential problem of pulling too much current through the ISA edge connector. The number of available DASD connectors should not be an issue because the CD-ROM 24 is not located in the base unit 18 of the split system 10. The power voltages that exit the system through the multi-conductor cable 20 connector go through a 2.5 amp resettable fuse to prevent cable or circuit damage in the event of a short.

Bulk +12V is provided to the media console 16 from cable 20. This is used to provide power to the CD-ROM and floppy disk drive DASD connectors 296, and 298 respectively. (It should be noted that +12V is still available in the DASD connector 298 to the floppy disk drive 22 even though current FDD's typically do not use +12V motors.)

There is also a current limited +12VDC bulk voltage that is used to regulate down to +5VDC. In order to handle the current requirement of each component of the media console 16, 3 independent regulators are implemented. One regulator 300, is for the 5VDC supply to the electronics (including keyboard and mouse), another regulator 302 is for the 5VDC to the floppy disk drive power connector 298 and a third regulator 304 is for the 5VDC for the CD-ROM power connector 296. The current to all three regulators is limited by a voltage dropping resistor 306. This resistor has been chosen to be a 2.4 ohm 10 watt resistor. Therefore the three regulators can supply a total of about 2 amps of current before dropping out of regulation. The regulators are attached to a sufficient heat sink to prevent overheating. The dropping resistor 306 is physically located on the host card 152 in the processing unit 18 so that the total heat dissipation would not be concentrated in the media console 16 where there is no fan. This means that there are two bundles of power conductors in the multi-conductor cable: +12VDC and +12V_DROP.

The multi-conductor cable 20 is a 28 gauge, 50 conductor cable composed of 25 pairs with a 50 pin CENTRONICS connector on one end (SCSI) which connects to the CENTRONICS connector 153 on host card 152 and a 50 pin header connector on the other end which connects to a connector port 58 on media console 16. The table in FIG. 14 shows the signal layout of the header. The cable 20 can be in a range of between 4 and 7 feet long with 6½ feet being the preferred length. The cable 20 allows the processing unit 18 to be placed along side, underneath or even behind the desk supporting the media console 16, or in a different room or office than the media console 16.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A computer system comprising:
   a first housing containing a floppy disk drive having an opening for receiving a floppy disk, said first housing including a base member having a recess disposed therein for receiving a drive housing which contains said floppy disk drive and is movable by a user between an open position and a closed position,
   a second housing separate from said first housing and containing a microprocessor coupled to a first bus, a non-volatile storage device coupled to said first bus and a power supply for supplying power to said system,
   an electrical connector having one end coupled to said first housing and another end coupled to said second housing for electrically connecting devices in said first housing to devices in said second housing.
   wherein said closed position is characterized in that said drive housing is disposed within said recess of said base member and said opening in said floppy disk drive is not accessible by said user, and
   wherein said open position is characterized in that a front portion of said drive housing is not within said recess of said base member and said opening in said floppy disk drive is accessible by said user.

2. The computer system of claim 1, wherein said first housing further includes a CD-ROM drive electrically coupled to said electrical connector and having an opening for receiving a compact disk.

3. The computer system of claim 1, wherein said drive housing further includes a CD-ROM drive electrically coupled to said electrical connector and having an opening for receiving a compact disk,
   wherein said closed position is further characterized in that said opening in said CD-ROM drive is not accessible by said user, and
   wherein said open position is further characterized in that said opening in said CD-ROM drive is accessible by said user.

4. The computer system of claim 3, wherein said floppy disk drive and said CD-ROM drive are disposed horizontally adjacent one another such that said opening in said floppy disk drive is substantially horizontally adjacent said opening in said CD-ROM drive.

5. The computer system of claim 1, wherein said non-volatile storage device is a hard disk drive.

6. The computer system of claim 5, wherein said first housing includes a power light indicator and a hard disk drive activity indicator.

7. The computer system of claim 1, wherein said first housing includes first and second external electrical connector ports for connecting said system to a keyboard and a pointing device respectively.

8. The computer system of claim 1, wherein said first housing is a desktop unit, said second housing is a tower unit and said electrical connector is a multiconductor flexible cable.

9. The computer system of claim 1, wherein said first housing further includes a power on/off switch for allowing a user to selectively power on or power off said computer system.

10. The computer system of claim 1, further including a sub-woofer integral with said processing unit and having a vent disposed on a side of said processing unit.

11. The computer system of claim 10, further comprising a shield disposed between said non-volatile storage device and said sub-woofer for shielding a magnetic field that emanates from a magnet within said sub-woofer from said non-volatile storage device.

12. A personal computer system comprising:
   a media console which includes a base member and a drive housing that can be moved between an open position and a closed position, said drive housing containing a direct access storage device having an opening for receiving a removable storage medium,
   a processing unit separate from said media console and containing a microprocessor coupled to a non-volatile storage device, and a power supply for supplying power to said system,
   an electrical connector having one end coupled to said media console and another end coupled to said processing unit for electrically connecting devices in said media console to devices in said processing unit, said electrical connector providing an interface between devices in said processing unit and devices in said media console,
   wherein said closed position is characterized in that said opening in said direct access storage device is not accessible by a user, and
   wherein said open position is characterized in that said opening in said direct access storage device is accessible by said user.

13. The computer system of claim 12, wherein said direct access storage device is a floppy disk drive and said removable storage medium is a floppy disk.

14. The computer system of claim 13, wherein said drive housing further includes a CD-ROM drive electrically coupled to said electrical connector and having an opening for receiving a compact disk.

15. The computer system of claim 13, wherein said base member includes an opening disposed therein for receiving said drive housing,

- wherein said closed position is further characterized in that said drive housing is disposed within said opening of said base member, and
- wherein said open position is further characterized in that said drive housing is not within said opening of said base member.

16. The computer system of claim 15, wherein said drive housing further includes a CD-ROM drive electrically coupled to said electrical connector and having an opening for receiving a compact disk,

- wherein said closed position is further characterized in that said opening in said CD-ROM drive is not accessible by said user, and
- wherein said open position is further characterized in that said opening in said CD-ROM drive is accessible by said user.

17. The computer system of claim 16, wherein said floppy disk drive and said CD-ROM drive are disposed horizontally adjacent one another such that said opening in said floppy disk drive is substantially horizontally adjacent said opening in said CD-ROM drive.

18. The computer system of claim 15, wherein said non-volatile storage device is a hard disk drive.

19. The computer system of claim 18, wherein said first housing includes a power light indicator and a hard disk drive activity indicator.

20. The computer system of claim 12, wherein said first housing includes first and second external electrical connector ports for connecting said system to a keyboard and a pointing device respectively.

21. The computer system of claim 12, wherein said media console is a desktop unit, said processing unit is a tower unit and said electrical connector is a multi-conductor flexible cable.

22. The computer system of claim 12, wherein said media console further includes a power on/off switch for allowing a user to selectively power on or power off said computer system.

23. The computer system of claim 12, further including a sub-woofer integral with said processing unit and having a vent disposed on a side of said processing unit.

24. The computer system of claim 23, further comprising a shield disposed between said non-volatile storage device and said sub-woofer for shielding a magnetic field that emanates from a magnet within said sub-woofer from said non-volatile storage device.

25. A computer system comprising:

- a first housing containing a CD-ROM drive having an opening for receiving a compact disk, said first housing including a base member having a recess disposed therein for receiving a drive housing which contains said CD-ROM drive and is movable by a user between an open position and a closed position,
- a second housing separate from said first housing and containing a microprocessor coupled to a first bus, a non-volatile storage device coupled to said first bus and a power supply for supplying power to said system,
- an electrical connector having one end coupled to said first housing and another end coupled to said second housing for electrically connecting devices in said first housing to devices in said second housing,
- wherein said closed position is characterized in that said drive housing is disposed within said recess of said base member and said opening in said CD-ROM drive is not accessible by said user, and
- wherein said open position is characterized in that a front portion of said drive housing is not within said recess of said base member and said opening in said CD-ROM drive is accessible by said user.

* * * * *